United States Patent
Matsugu et al.

(10) Patent No.: US 7,580,587 B2
(45) Date of Patent: Aug. 25, 2009

(54) DEVICE AND METHOD FOR CORRECTING IMAGE INCLUDING PERSON AREA

(75) Inventors: Masakazu Matsugu, Chiba (JP); Katsuhiko Mori, Kawasaki (JP); Yusuke Mitarai, Yokohama (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 11/166,626

(22) Filed: Jun. 24, 2005

(65) Prior Publication Data

US 2006/0008173 A1     Jan. 12, 2006

(30) Foreign Application Priority Data

Jun. 29, 2004   (JP)  ............... 2004-191639

(51) Int. Cl.
G06K 9/40 (2006.01)
G06K 9/46 (2006.01)
G06K 9/54 (2006.01)

(52) U.S. Cl. .................. 382/274; 382/190; 382/305

(58) Field of Classification Search ................. 382/118, 382/167, 260, 274, 309, 190, 305
See application file for complete search history.

(56) References Cited

U.S. PATENT DOCUMENTS

| | | | |
|---|---|---|---|
| 6,252,976 B1 | 6/2001 | Schildkraut et al. | |
| 6,292,574 B1 | 9/2001 | Schildkraut et al. | |
| 6,463,176 B1 | 10/2002 | Matsugu et al. | |
| 6,636,635 B2 | 10/2003 | Matsugu | |
| 6,980,691 B2 * | 12/2005 | Nesterov et al. | 382/165 |
| 7,013,025 B2 * | 3/2006 | Hiramatsu | 382/103 |
| 7,024,035 B1 * | 4/2006 | Enomoto | 382/167 |
| 7,035,461 B2 * | 4/2006 | Luo et al. | 382/167 |
| 7,110,597 B2 * | 9/2006 | Goldsmith | 382/167 |
| 7,310,443 B1 * | 12/2007 | Kris et al. | 382/167 |
| 2002/0038294 A1 | 3/2002 | Matsugu | |
| 2003/0068084 A1 * | 4/2003 | Kinjo et al. | 382/164 |
| 2004/0228528 A1 * | 11/2004 | Lao | 382/167 |

FOREIGN PATENT DOCUMENTS

JP    2000-125320 A    4/2000
JP    2002-271808 A    9/2002

OTHER PUBLICATIONS

Shakhnarovich, et al. "A unified learning framework for real time face detection and classification", IEEE, pp. 14-21, 2002.*

(Continued)

*Primary Examiner*—Daniel G Mariam
(74) *Attorney, Agent, or Firm*—Canon U.S.A. Inc., I.P. Division (57) ABSTRACT

A person area is detected from an inputted image, a category to which a person shown in the person area belongs is recognized, a correction area is extracted from the person area, and the correction area is corrected based on the recognized category. Thus, the inputted image is easily corrected in an appropriate manner according to the category of the person, that is, an object.

8 Claims, 7 Drawing Sheets

OTHER PUBLICATIONS

Gaubatz, et al. "Automatic red-eye detection and correction", IEEE, pp. 804-807, 2002.*

M. Matsugu et al., "Convolutional Spiking Neural Network Model for Robust Face Detection," Proc. Of International Conference On Neural Information Processing 2002.

Cottrell, et al., "Empath:Face, Emotion, and Gender Recognition Using Holons," Advances in Neural Information Processing Systems, 3, pp. 564-571, 1991.

Gutta, et al., "Mixture of Experts for Classification of Gender, Ethnic Origin, and Pose of Human Faces," IEEE Transactions on Neural Networks, vol. 11, p. 948-959, 2000.

Golomb, et al., "SEXNET: A Neural Network Identifies Sex From Human Faces," Advances in Neural Information Processing Systems, pp. 572-577, 1990.

Iga, et al., "System For Recognizing Gender and Age by Human-Face Image" The ninth image-sensing symposium. 2003.

* cited by examiner

DEVICE AND METHOD FOR CORRECTING IMAGE INCLUDING PERSON AREA

BACKGROUND OF THE INVENTION

1. Field of the Invention

The present invention relates to an image-processing device for correcting at least one person area in an image and a method used therefor.

2. Description of the Related Art

When photographing a person by using flash, the eyes of the person often become red, which is known as the red-eye phenomenon. Today, since such a person image can be generated, as digital image data, we have various methods for changing the color of a red-eye area into another color. Japanese Patent Laid-Open No. 2000-125320 discloses one of the methods. Namely, a flesh-color area including a face characteristic is detected, a set of red-eye defects is detected, and color modification is performed for the red-eye-defect area. Further, Japanese Patent Laid-Open No. 2002-271808 discloses a method for generating a characteristic-amount histogram corresponding to a correction area included in the red-eye area, generating a correction curve based on the minimum value, maximum value, modal, average value, and distribution that are obtained by the histogram, and correcting the saturation and brightness of the correction area according to the correction curve.

Further, video cameras that can perform skin-beautifying processing have been proposed. Once the video camera is set to skin-beautifying mode, the flesh-color area is detected, and skin-beautifying processing is performed for the detected flesh-color area.

However, the above-described technologies have the following problems. For example, when the color of a photograph in which the red-eye (or gold eye) phenomenon occurs is corrected, it is difficult to automatically determine the color of the corrected area to be a suitable color (stored color). Particularly, since the iris color of a pupil under observation changes according to fluctuations in illumination conditions and the race and/or personal characteristic of the object person, the correction result often becomes unnatural only by reducing the saturation and/or brightness of the red-eye area. Therefore, a method and/or a device for reproducing the original and/or suitable pupil color have been sought.

Further, when the skin-beautifying processing is uniquely performed for every flesh-color area, an object having a color similar to the flesh color, that is, the object color that should not be corrected is often subjected to the skin-beautifying processing. Further, the above-described technologies do not allow selecting a specific person from among a plurality of persons shown in a single image and performing the correction for the specific person.

SUMMARY OF THE INVENTION

The present invention provides an image-processing device and a method used therefor that allow easily correcting the image of an object person in a suitable manner according to a predetermined category to which the object person belongs. According to one aspect, the present invention provides an image-processing device including an input unit configured to input at least one image, a person-area detection unit configured to detect at least one person area from the inputted image, a recognition unit configured to recognize at least one category to which at least one person in the person area belongs, an extraction unit configured to extract at least one correction area from the person area, and a correction unit configured to correct the correction area based on the category recognized by the recognition unit.

According to another aspect, the present invention provides an image-processing method including steps of inputting an image, detecting a person area from the inputted image, recognizing at least one category to which at least one person in the person area belongs, extracting at least one correction area from the person area, and correcting the correction area based on the category.

Other features shall be apparent to those skilled in the art from the description of exemplary embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Exemplary embodiments of the present invention will now be described with reference to the accompanying drawings.

First Embodiment

Figure 1:
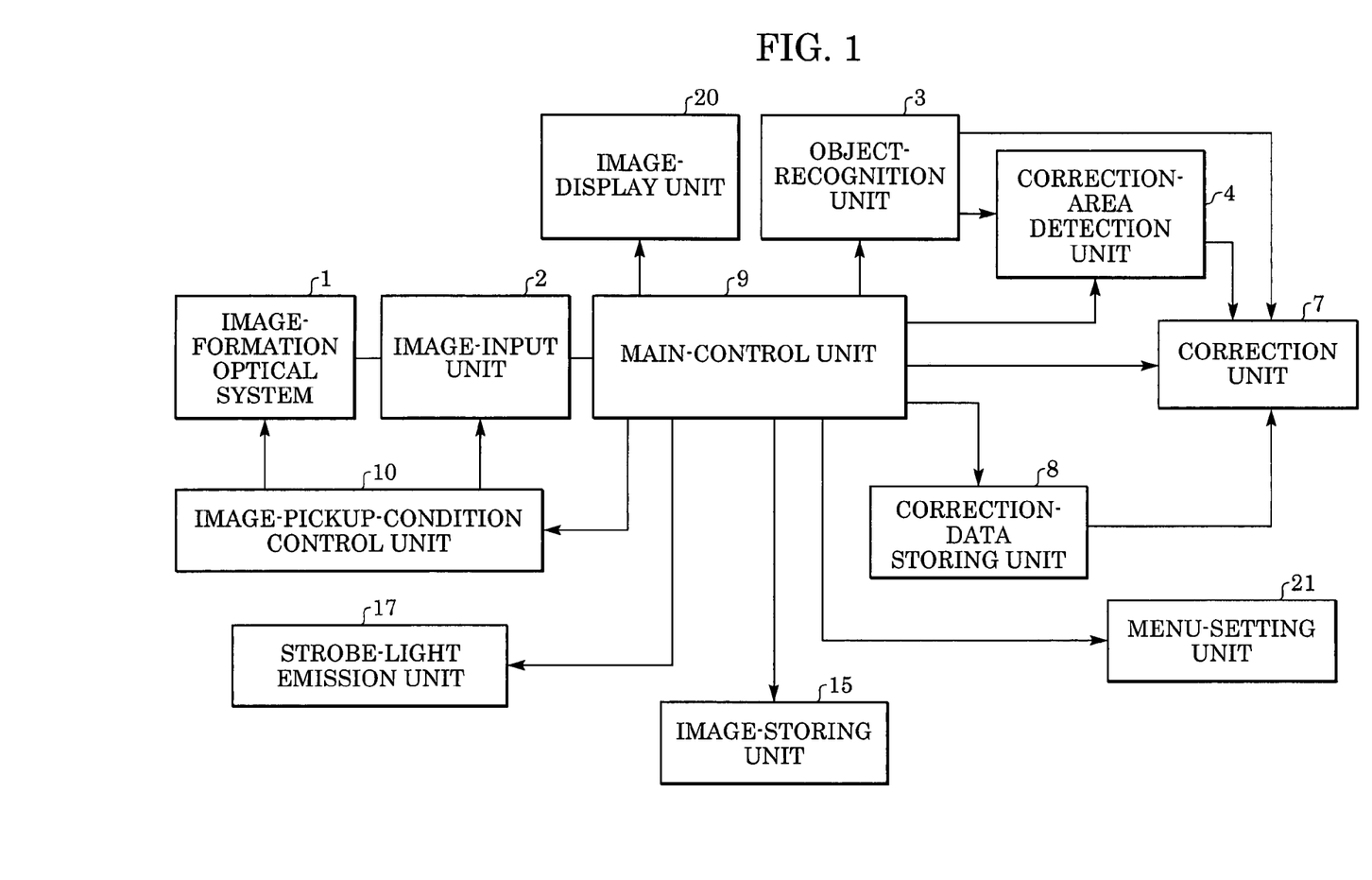
FIG. 1 shows the functional configuration of an image-pickup device according to a first embodiment of the present invention.

FIG. 1 shows the functional configuration of an image-pickup device according to a first embodiment of the present invention. The image-pickup device includes an image-formation optical system 1, an image-input unit 2 having an image sensor, a sensor-signal processing circuit, and a sensor-driver circuit, an object-recognition unit 3, a correction-area detection unit 4, a correction unit 7, a correction-data storing unit 8 for storing correction data on every recognition object, a main-control unit 9 for exerting control over operations of the above-described units, an image-pickup-condition control unit 10, a strobe-light emission unit 17, an image-display unit 20 including a liquid-crystal display or the like, a menu-setting unit 21, an image-storing unit 15, and so forth. Next, the function and the flow of processing performed by each of the above-described units will be described.

The image-input unit 2 is formed, as a module for inputting an image. The image-input unit 2 can input an image obtained by image pickup and/or an image read from an image database. In the former case, a charge-coupled device (CCD), a complementary metal-oxide-semiconductor (CMOS), and so forth are used for sensing the image so that a predetermined image signal is transmitted by a read-control signal transmitted from a sensor-driver circuit (not shown). Where the image inputting is performed by using the image obtained by image pickup, the image-pickup-condition control unit 10 controls light-exposure-amount control parameters, white-balance-control parameters, and other image-pickup parameters.

Figure 3:
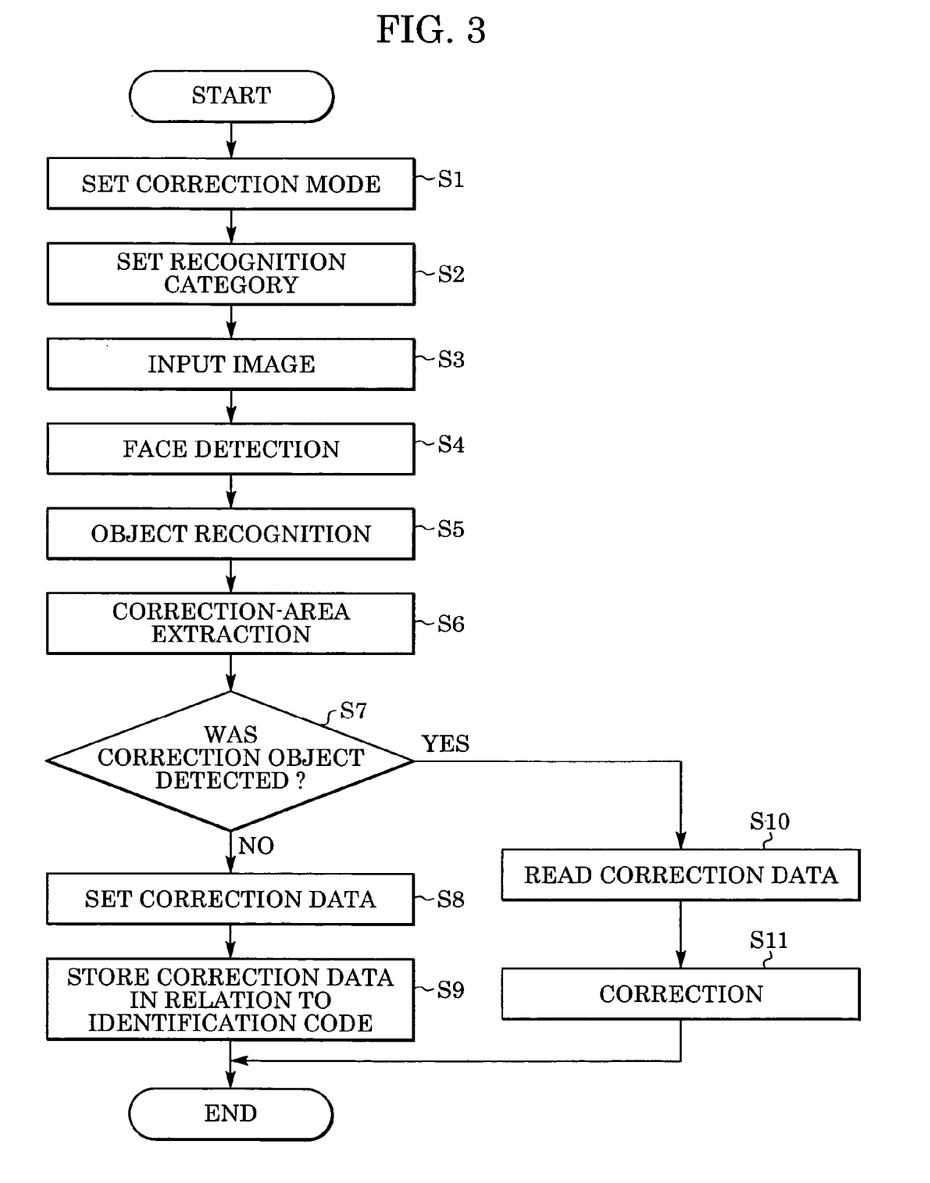
FIG. 3 is a flowchart illustrating correction processing according to the first embodiment.

As shown in a flowchart of FIG. 3, first, a user selects one of correction modes (the type of correction to be performed) for the correction unit 7, at step S1, and selects one of recognition categories, at step S2 by using the menu-setting unit 21. The correction modes include, for example, a red-eye and/or gold/eye correction mode, a skin-beautification mode, a freckle and/or wrinkle removing mode, and so forth. The user selects one of the above-described modes shown on a menu. Otherwise, a predetermined mode may be set according to default settings and changed, as required. The recognition categories are provided, as identification classes, and include a personal-recognition category, a gender-recognition category, an age-recognition category, a race-recognition category, and so forth.

Figure 2:
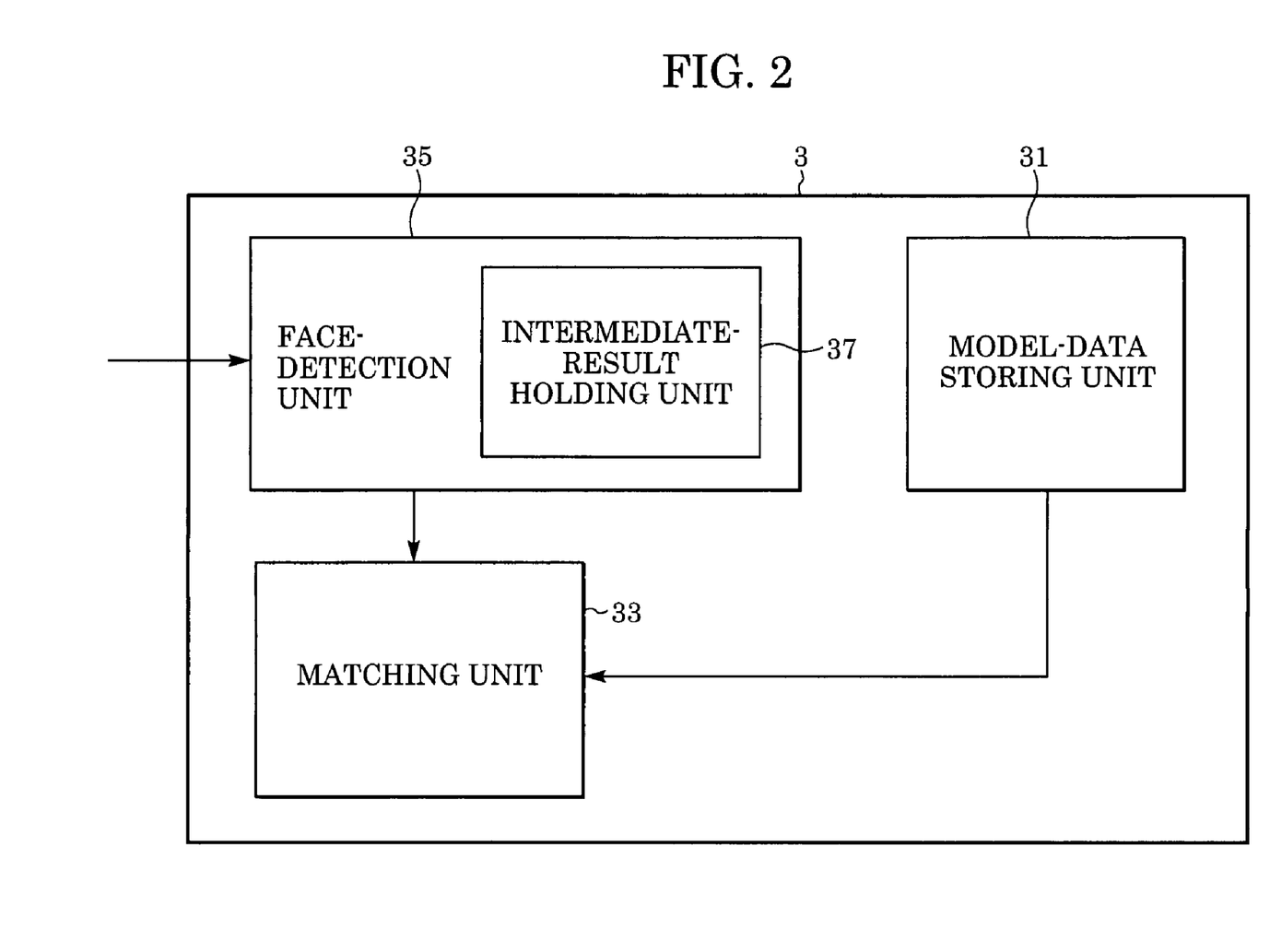
FIG. 2 shows the functional configuration of an object-recognition unit.

Here, the personal-recognition category is selected and a model-data storing unit 31 in the object-recognition unit 3 stores model data on a predetermined face required for identifying a specific person. The model data includes face-image data, predetermined characteristic-vector data on the entire face, where the characteristic-vector data is obtained by principal component analysis and/or independent component analysis, and local-characteristic data relating to a characteristic area of the face, such as the eyes, the mouth, and so forth.

FIG. 2 shows the functional configuration of the object-recognition unit 3. In the object-recognition unit 3, a matching unit 33 matches the face area of the specific person extracted by a face-detection unit 35 with the model data that was stored in the model-data storing unit 31 in advance, so that the specific person is identified. The details of the matching will be described later.

After the user selects the correction mode and the recognition category, image-inputting is performed, at step S3, and the image-input unit 2 transmits data on the image to the face-detection unit 35, so that face detection is performed, at step S4.

The face-detection unit 35 is provided, as a module for detecting a face area by separating the face area from the background of the transmitted image and transmitting the detection result of elements of the face, such as the eyes and the mouth, as an intermediate output. According to the first embodiment, the eyes and/or mouth is detected in an intermediate layer and the face area is detected in an output layer by using a convolutional neural network (refer to M. Matsugu et al., "Convolutional Spiking Neural Network Model for Robust Face Detection," Proc. Of International Conference On Neural Information Processing '02). An intermediate-result holding unit 37 in the face-detection unit 35 holds data on the detected eyes and/or mouth, i.e., address data corresponding to the detected area.

Next, the matching unit 33 recognizes a person or the like, at step S5. The matching unit 33 matches the amount of characteristics extracted from the data on the detected figure image with the model-characteristic-amount data stored in the model-data storing unit 35. For example, the model-characteristic-amount data may be, for example, Gabor-wavelet transformation data (Gabor jet) on the major parts of the face, such as the eyes and/or the mouth, a characteristic vector obtained by performing convolutional operation of a predetermined plurality of space-filter kernels. The above-described matching is performed by using the k-NN method, the discriminant function method, a support-vector machine (SVM), a convolutional neural network, and so forth.

Next, the correction-area detection unit 4 automatically detects an area for correction (hereinafter referred to as a correction area) from the transmitted image according to the selected correction mode, at step S6. For example, where the red-eye-and/or-gold/eye correction mode is selected, image data on an area from which the eyes are detected is read from the transmitted image, based on the address data stored in the intermediate-result holding unit 37. Then, a pupil area including red or gold eyes is retrieved and extracted, as the correction area. Where the skin-beautification mode is selected, as the correction mode, the flesh-color-component region of the entire face is extracted, as the correction area.

According to this example, the red-eye-and/or-gold-eye correction is selected. The correction-area detection unit 4 reads the intermediate-output result obtained by the face-detection unit 35 from the intermediate-result holding unit 37. Then, the correction-area detection unit 4 detects an area having a red-eye color component (the hue-component value), or a local area showing the gold-eye characteristic from the eye area of the detected face. Here, the local area denotes an area whose diameter corresponds to at least twenty percent of the pupil diameter. Further, the brightness of the local area is at high levels of at least a hundred and twenty-five. The shape of the local area is nearly a circle.

The above-described area including the red-eye color component is detected and determined to be the red-eye area, that is, the correction area by the correction-area detection unit 4. The red-eye area is an oblong or circular area that is defined in the pupil area and that includes pixels presenting the red-eye defect or the gold-eye defect. Correction-determination processing is performed in the correction area based on the following determination data, at step S7. For example, where the red-eye-and/or-gold-eye correction is performed, it is determined whether or not a hue defect exists in each of the pixels in the eye area. For achieving the above-described determination, the pupil area is scanned, so as to determine whether or not the red-eye or gold-eye phenomenon occurs in each of the pixels.

Where the red-eye correction mode is selected, the hue-component information corresponding to the normal-value range of the eye area is read, as determination data. The normal-value range corresponds to the range of normal hue values corresponding to a normal state in which no red eye or gold eye occurs. On the other hand, in the case where the skin-beautifying mode is selected, data on flesh color suitable for a recognized person is read from the correction-data storing unit 8 and transmitted to a correction-area detection unit 6. A determination area is determined according to the correction mode. For example, where the red-eye correction mode is selected, the pupil area is determined to be the determination area and where the skin-beautifying mode is selected, the face area is determined to be the determination area. Then, the hue-component values of pixels in the determination area are compared to those of the determination data. If the hue-component values are not within the normal-value range, the coordinates of the pixels are stored in a predetermined memory, as the pixels of the correction area.

Where the correction-area pixels are detected, as the result of the above-described determination, the correction data is read from the correction-data storing unit 8, at step S9. The correction data read from the correction-data storing unit 8 is provided, as correction parameters or data including color-component data that relates to a specified person and that is provided, as a stored color corresponding to the correction mode.

Although RGB space may be used, as color space used for representing the color-component data, it is preferable that the color space represent color difference similar to the human vision. A uniform color space, for example, Lab-color space and/or Luv-color space defined by International Commission on Illumination (CIE) is preferable.

For example, where the red-eye-and/or-gold-eye correction mode is selected, data on the color of the specific person's irises is read from the correction-data storing unit 8 and transmitted to the correction unit 7. Where the skin-beautifying mode is selected, data on a flesh-color component is read from the correction-data storing unit 8 and transmitted to the correction unit 7, as a stored color of the specific person.

The lookup-table method is used, as the method for storing data in the correction-data storing unit 8. In this method, a lookup table showing an arrangement of pairs of data is used. One of the pairs of data is personal identification data and the other is the correction data (or correction parameters) corresponding to the personal identification data. In the correction unit 7, correction is performed for the specified person according to the mode selected for the correction area, at step S11.

Where the object-recognition unit 3 does not identify (recognize) the specific person, correction data is set according to the correction mode, at step S8. For example, where the red-eye-and/or-gold-eye correction mode is selected, the iris-color data of the specific person is obtained and/or a stored color is set and/or selected for the irises of the specific person. In the former case, image-pickup is automatically performed mainly for the detected face area without using flash. The object-recognition unit 3 detects the face area again, so that the eye area is obtained. Then, the pupil area is extracted from the eye area, and the iris-color data is detected from the pupil area. In that case, the user may be provided with an instruction to perform non-flash photographing by speech and/or a display image.

In the latter case, that is, where the stored color for the irises is set and/or selected, the camera user or an object person sets and/or selects the iris color of pupils of the object person in an interactive manner. More specifically, for example, the images of at least two iris-color candidates are produced on the image-display unit 20, as pupil-image data. Here, the image-display unit 20 may be provided, as a touch-panel screen. After that, a predetermined pattern having a desired color component (the stored color) is selected from among the iris-color candidates by the user and/or the object person. Then, the correction-data storing unit 8 stores the correction data, at step S10. The main control unit 9 is used for storing the correction data (the iris-color data or the like) to which a predetermined identification code is added, as supplementary data, in the correction-data storing unit 8. The details of the predetermined identification code will be described later. The correction data corresponding to the correction area is stored in the correction-data storing unit 8 in relation to a specific personal name, for example.

More specifically, the identification code is added to the correction data in the following manner. First, where face-image data with identification codes added thereto includes a face image that is the same as that of the object person, the display images of the entire face-image data are produced on the touch-panel display unit 20, as thumbnail images. Then, the user and/or the object person selects the face image that is the same as that of the object person so that the same identification code as that of the selected face image can be added to the correction data. The reason why the object-recognition unit 3 often cannot identify the object person even though the face-image data includes the object person's face image is that the appearance of one and the same person often significantly changes according to the photographing conditions such as the hair style and countenance of the person, illumination, and so forth.

On the other hand, where the face-image data with the identification codes does not include the face image of the object person, an identification code different from any of the identification codes corresponding to other persons is automatically generated and added to the face image of the object person. Otherwise, the user and/or the object person inputs the name of the object person.

The object-recognition unit 3 detects a main object such as the face of a person via an input screen and performs personal-recognition processing. The details of processing performed by the object-recognition unit 3 will be described with reference to FIG. 2. The object-recognition unit 3 extracts a geometrical characteristic and/or other characteristics including color information, moving-vector information, and so forth at each of positions or sampling points in the inputted-image data. Then, the object-recognition unit 3 matches the characteristics with the model data based on the characteristic amount, or performs template matching or the like, so as to detect and recognize an object in a selected category. According to this embodiment, the object denotes a predetermined person and the recognition denotes personal identification.

In the object-recognition unit 3, the model-data storing unit 31 stores a plurality of items of image information in the category of an object to be detected in advance. The face-detection unit 35 extracts the above-described characteristic amount at the position of a predetermined sampling point. The matching unit 33 matches the inputted-image data with the model data based on the extracted characteristic amount. The above-described matching includes similarity calculation, for example.

An example of the similarity calculation performed by the matching unit 33 will be described below. In the case of an image-information extraction device according to U.S. Pat. No. 6,636,635 obtained by the applicant of the present invention, a template-model image of a size suitable for the distance between the device and an object is generated. Then, an image screen is scanned by using the template-mode image, and a normalization-correlation coefficient or the like is calculated at every position. Subsequently, the distribution of similarities between local areas of the inputted image and model data can be calculated. When the maximum value of the similarity distribution exceeds a predetermined threshold value of a predetermined category, it is generally assumed that a pattern in the category was extracted.

For reducing the time for detecting the object (person), the primary-characteristic amount (the amount of a lower-order characteristic such as a moving vector, color information, and so forth) can be extracted from time-series inputted image data according to a known method in advance, as preprocessing, and a candidate area with a high possibility that a main object exists therein can be extracted so that the search area is narrowed. For example, when the color information is extracted, image areas having a color similar to that of main part of model-image data (e.g., the flesh color of a person) that was stored in advance can be extracted through threshold-value processing. Otherwise, an area having at least a predetermined number of vectors can be extracted from the above-described extracted image areas, as an object-candidate area. After that, the above-described similarity calculation can be performed on each of the sampling points in the object-candidate area.

The primary-characteristic amount extracted for the preprocessing can be other low-order characteristic amounts. For example, a geometrical characteristic including a direction component in a predetermined range and a space frequency in another predetermined range, or a local characteristic element disclosed in U.S. Pat. No. 6,463,176 obtained by the applicant of the present invention can be used.

Further, the matching unit 33 can be provided, as another unit such as a hierarchical neural network circuit disclosed in U.S. Published Application No. 2002-38294 filed by the applicant of the present invention.

Figure 4:
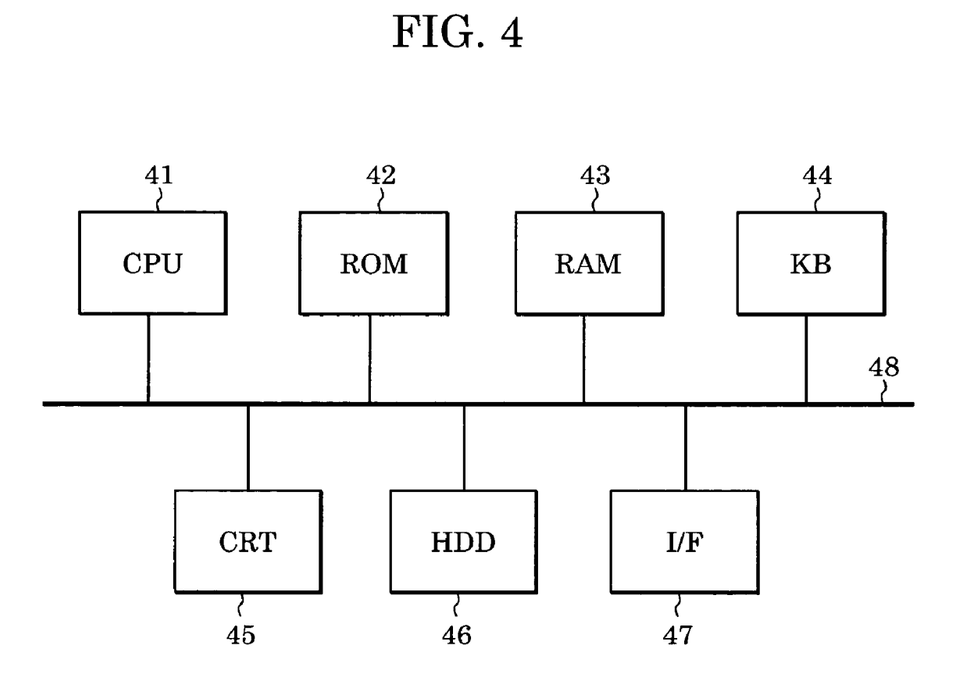
FIG. 4 is a block diagram showing the hardware configuration of an image-processing device according to the first embodiment.

FIG. 4 is a block diagram showing the hardware of an image-processing device according to this embodiment. The image-processing device can be used, as part of the image-pickup device, or connected to the image-pickup device, so as to perform the above-described correction processing.

The CPU 41 exerts control over the image-processing device by using a program and/or data stored in a read-only memory (ROM) 42 and a random-access memory (RAM) 43, and performs processing procedures that will be described later.

The ROM 42 stores a boot program, data on settings on the image-processing device, and so forth.

The RAM 43 has a work area used by the CPU 41 for performing various types of processing and an area for temporarily storing a program and/or data loaded from a hard disk (HDD) 46.

A keyboard 44 is an operation unit used for transmitting various instructions issued by the user to the central processing unit (CPU) 41. Further, the keyboard 44 can include a pointing device such as a mouse.

A cathode-ray tube (CRT) 45 is a display unit that can display the result of processing performed by the CPU 41 by text and/or an image. A liquid-crystal display unit may be provided in place of the CRT 45.

The hard-disk drive (HDD) 46 is an external storage device with a large capacity and stores an operating system (OS), and at least one program and/or data for causing the CPU 41 to execute the function of each of the units shown in FIG. 1. Part of or the entire information stored in the HDD 46 is loaded into the RAM 43 under the control of the CPU 41. The HDD 46 further stores the correction data, the model data, and so forth that are also loaded into the RAM 43 under the control of the CPU 41, as required. A drive used for driving a compact disk (CD), a digital versatile disk (DVD), and so forth can be provided, as the external storage device.

An interface (I/F) 47 is an interface used for performing data communications between the image-processing device and an external device. For example, the data on an image including an object to be corrected can be transmitted from a digital camera connected to the I/F 47 to the image-processing device, or downloaded from a predetermined computer to the image-processing device. The image data is temporarily stored in the RAM 43 and processed by the CPU 41. Each of the above-described units is connected to a bus 48.

Second Embodiment

According to the first embodiment, a category to be recognized and correction processing to be executed (the correction mode) are set by the user. However, according to a second embodiment of the present invention, specific correction processing that was set in advance is performed according to a category that is obtained, as an output transmitted from the object-recognition unit 3. The category is shown, as "young female", "Westerner", and so forth, for example. The details of the correction processing performed according to the recognized category may not be uniformly determined. That is to say, the user can set the details of the correction processing before an image is transmitted.

Figure 5:
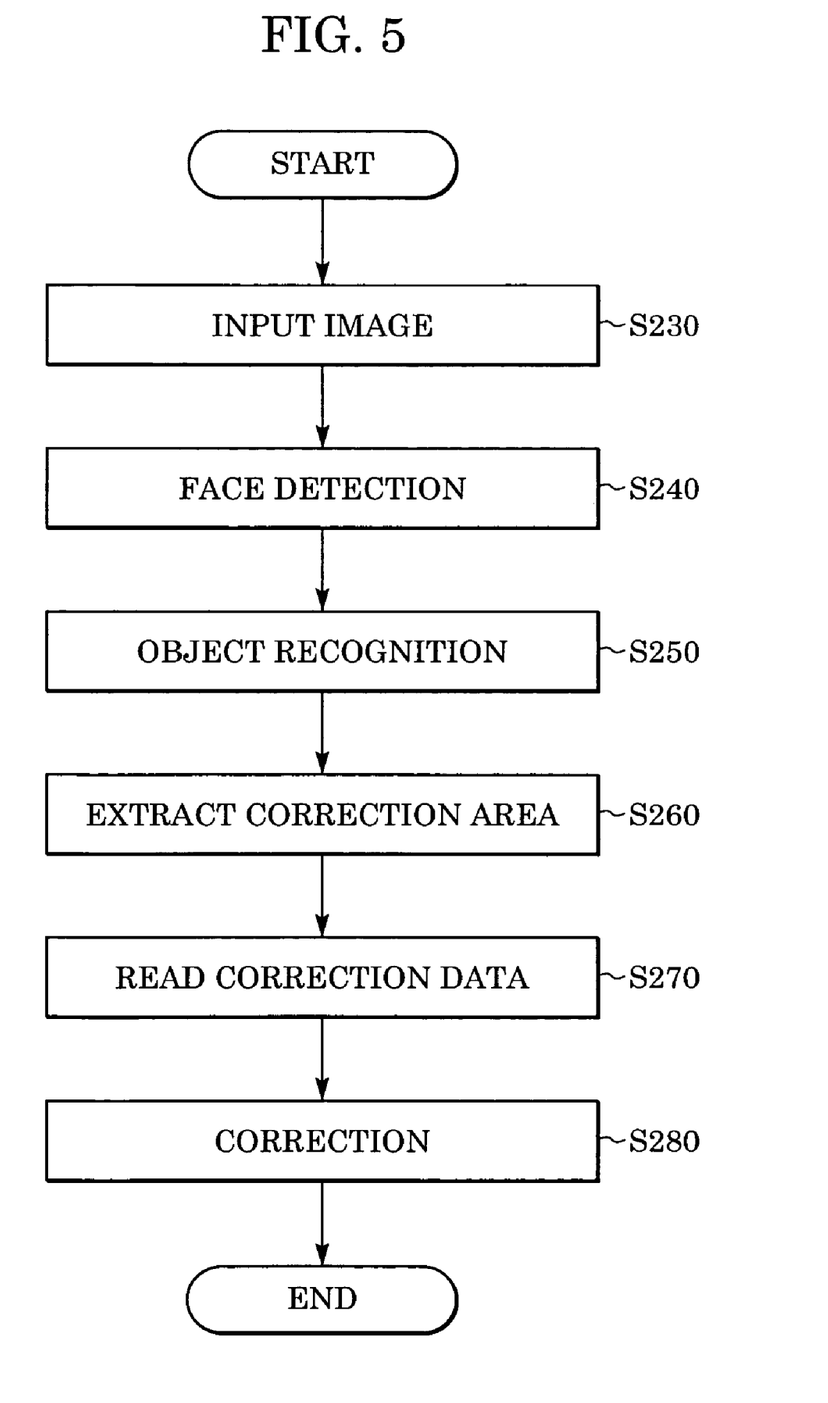
FIG. 5 is a flowchart illustrating correction processing according to a second embodiment of the present invention.

The functional configuration of an image-processing device according to the second embodiment is the same as that shown in FIG. 1, except that operations of the units are partly different from those of the units shown in FIG. 1. FIG. 5 is a flowchart showing the steps of correction processing according to the second embodiment.

First, an image is input via the image-formation optical system 1 and the image-input unit 2, at step S230, and the face detection is performed, at step 240. Further, object-recognition processing is performed for a detected face area, at step S250. The details of the face detection are the same as those of the first embodiment.

As a result of the object-recognition processing that was performed, at step S250, the object-recognition unit 3 transmits predetermined information, as the recognition category. The predetermined information includes information about the gender of an object person, or information about discrimination between masculinity and feminineness of the object person, information about discrimination between races (e.g., an easterner and a westerner, and the white race, the black race, and the yellow race), information about discrimination between an elderly person and a young person, and information about the occurrence or the absence of a red eye and/or a gold eye. At least one of the above-described information elements or a combination of at least two of those elements can be transmitted, as the recognition category. For example, a combination of elements such as "young person+female+red-eye occurrence" can be transmitted, as the recognition category.

Of all the recognition categories, the information about discrimination between genders or masculinity and feminineness and the information about discrimination between races can be generated by using known technologies including a neural network, a support vector machine, and so forth. The above-described technologies are disclosed, for example, in Cottrell, G. W. & Metcalfe, J. (1991) "EMPATH: Face, Emotion and Gender Recognition Using Holons," in Advances in Neural Information Processing Systems, 3, pp. 564 to 571., Gutta, S., Huang, J. R. J., Jonathon, P., Wechsler, H. (2000) "Mixture of Experts for Classification of Gender, Ethnic Origin, and Pose of Human Faces," IEEE Transactions on Neural Networks, Vol. 11, p. 948 to 959., Golomb, B. A., Lawrence, D. T., Sejnowski, T. J. (1990) "SEXNET: A Neural Network Identifies Sex From Human Faces," in Advances in Neural Information Processing Systems, pp. 572 to 577., and Iga, Izumi, Hayashi, Fukano, Otani (2003) "System For Recognizing Gender and Age by Human Face Image," The ninth image-sensing symposium.

The correction-area detection unit 4 determines a correction area according to the recognition category transmitted from the object-recognition unit 3, at step S260. For example, when the recognition category indicates that the object person is a young female, a flesh-color-component area of the face, that is, an area centered on the cheeks and the tails of the eyes is determined to be the correction area. Further, when "red-eye occurrence" is added, as a recognition category, the pupil area is added, as the correction area.

The correction unit 7 for correcting an image reads the correction data from the correction-data storing unit 8, at step S270. The correction data includes data showing the details of correction that was determined in advance for each of the recognition categories. The data includes information about suitable flesh hues, textures, and so forth. The correction unit 7 corrects the correction area of image data so that the hue and texture thereof substantially match the above-described information about suitable hues and textures of the correction data, at step S280. Here, the correction area corresponds to flesh-color pixels of a recognized figure-image area.

According to the second embodiment, the correction processing includes not only simple correction such as color-component-value correction and brightness-value correction, but also texture-pattern correction. Further, a display image for requesting the user to verify the details of correction can be produced on the image-display unit 20 before the correction is performed. In that case, the correction is performed after the user generates and transmits a verification message through the menu-setting unit 21.

For example, when the output result of the recognition category transmitted from the object-recognition unit 3 indicates that the object person is a "young female", processing-program data used for performing skin-beautifying correction, beautiful-skin-color correction data, and so forth are read from the correction-data storing unit 8, and the skin-beautifying correction is performed so that the hue of a face area of the object person is corrected. Subsequently, each of flesh-color components of the face area represents a suitable flesh color. Further, automatic correction is performed, so as to reduce the skin roughness and/or freckles of the face, for example. The data on a specific correction program performed according to each of the recognition categories and the correction data are stored in the correction-data storing unit 8 in advance. Further, a correction mode for performing the above-described automatic correction according to the object-recognition result is set in advance by the user, for example (not shown in FIG. 5).

When the recognition category indicates that the object person is a "middle-aged or elderly female", for example, correction is performed for reducing or removing wrinkles on the face. More specifically, wrinkles on or around the tails of the eyes, the cheeks, the brow, and so forth are detected, and the detected wrinkles are removed or smoothed out.

The recognition category can be a specific countenance. For example, "face with glassy eyes", "face with sad eyes" may be determined to be the recognition category. In that case, "transformation into face with happy eyes" is set. The above-described countenance-transformation processing can be performed by using known technologies. For example, local coordinate transformation (e.g., affine transformation) corresponding to every countenance may be performed for main part of the face, such as the eyes, or a predetermined part that can be a countenance-expression unit, that is, an action unit according to the Ekman's classification.

The amount of image characteristics required for category classification is extracted for storing the correction data in the correction-data storing unit 8 at the object-recognition time.

Third Embodiment

Figure 6:
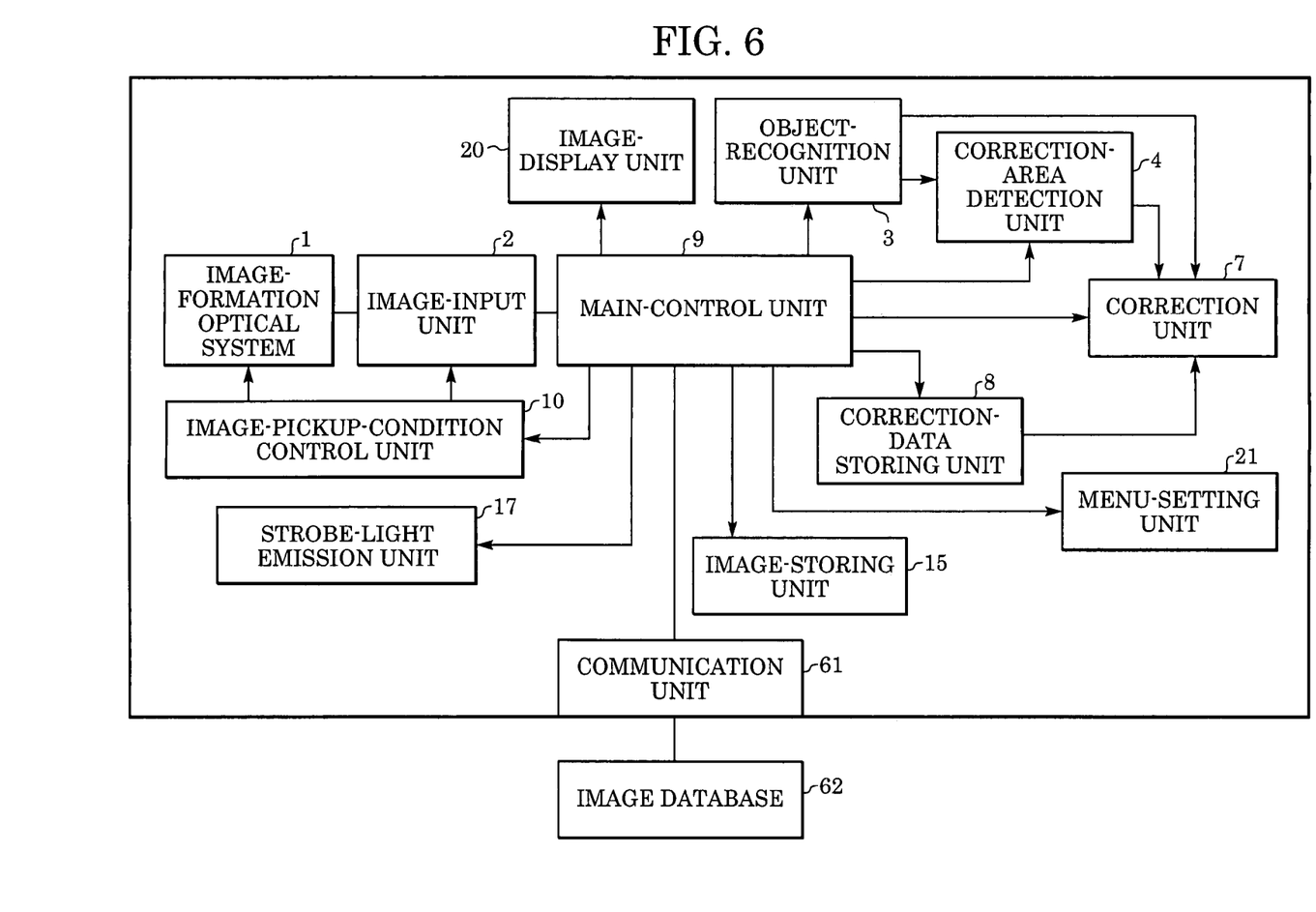
FIG. 6 shows the functional configuration of an image-pickup device according to a third embodiment of the present invention.
Figure 7:
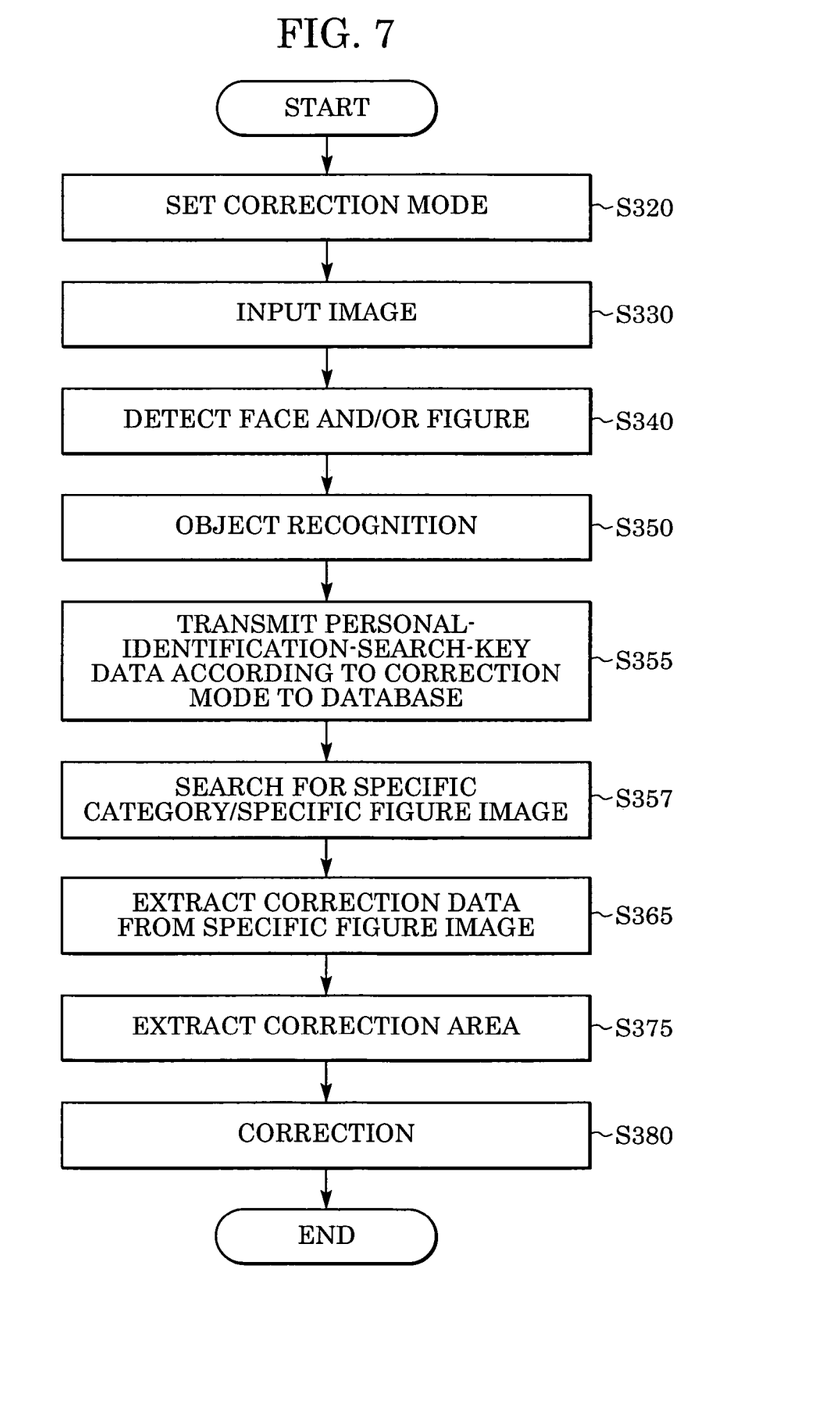
FIG. 7 is a flowchart illustrating correction processing according to the third embodiment.

FIG. 6 shows the functional configuration of a system according to a third embodiment of the present invention. The above-described system has the same configuration as that shown in FIG. 1 except that a communication unit 61 and an image database 62 are provided. FIG. 7 is a flowchart showing correction procedures performed according to the third embodiment.

In the exemplary embodiment shown in FIG. 6, all of the components except the image database 62 are accommodated in a single cabinet. However, other configurations are possible; for example, some components can be separated and provided outside the cabinet. Each of images stored in the image database 62 has at least one search key added thereto. The search key includes the name of a person in the image, the image-photographing time, the photographing place, and so forth.

First, at step S320, the user selects a correction mode via the menu-setting unit 21 before an image is transmitted. The correction mode may be red-eye correction, skin-beautification correction, hair-addition correction, correction for transforming the hair color into a predetermined color, and so forth. Then, after the image is transmitted, at step S330, a face or a person is detected, at step S340, and object recognition for recognizing the person is performed, at step S350. Subsequently, personal recognition data is obtained and transmitted to the image database 62 provided outside via the communication unit 61, as search-key data, at step S355. Then, a search is made for a specific figure image that matches the search-key data, at step S357. When the specific figure image is obtained, correction data (parameters) is extracted therefrom, at step S365.

Here, the search-key data includes the characteristic amount of an image used for recognizing a person. For example, the characteristic amount can be Gabor-wavelet transformation data in a predetermined local area such as the eyes and the mouth, and parameters that are set according to the correction mode.

For example, when the red-eye correction is selected, as the correction mode, face-image data including no red eyes is retrieved from the set of images that show the person recognized by the object-recognition unit 3 and that are stored in the image database 62. Then, data on representative-color components of the iris part of the face area is extracted, as correction data. Further, when the hair-addition correction is selected, as the correction mode, the oldest face image of entire face images of a specific person is extracted from the image database 62. In that case, the search key can be information about the name, age, and so forth of the specific person.

After that, a correction area is selected, at step S375, and the image of the specific person shown in a transmitted image is corrected, based on the extracted correction data, at step S380.

Other Embodiments

It is to be understood that a recording medium (or storage medium) storing program code (software) for implementing the functions of the above-described embodiments may be supplied to a camera or a computer so that a central-processing unit (CPU) and/or a microprocessing unit (MPU) of the camera or the computer reads and executes the program code stored in the recording medium. In that case, the program code itself, read from the recording medium, achieves the functions of the above-described embodiments.

Furthermore, not only by the camera or the computer reading and executing the program code, but also by an operating system (OS) or the like running on the camera executing part of or the entire process based on instructions of the program code, the functions of the above-described embodiments may be achieved.

In another embodiment of the present invention, the program code read from the recording medium may be written into a function extension card inserted into the camera or the computer, or a memory of a function extension unit connected to the camera or the computer. The functions of the above-described embodiments may be realized by executing part of or the entire process by a CPU, etc. of the function extension card or the function extension unit based on instructions of the program code.

When the present invention is used for the above-described recording medium, the recording medium stores program code corresponding to the above-described flowcharts.

The above-described embodiments of the present invention facilitate correcting a transmitted image in a manner suitable for a specific object (or an object category) shown in the transmitted image.

While the present invention has been described with reference to exemplary embodiments, it is to be understood that the invention is not limited to the disclosed embodiments. The scope of the following claims is to be accorded the broadest interpretation so as to encompass all modifications, equivalent structures and functions.

This application claims priority from Japanese Patent Application No. 2004-191639 filed Jun. 29, 2004, which is hereby incorporated by reference herein in its entirety.

What is claimed is:

1. An image-processing device comprising:

An input unit configured to input at least one image; and a processor configured to select a type of correction to be performed, to detect at least one person area from the image input via the input unit, to identify at least one person in the person area, to search an image database for another image of the identified person which is suitable for performing the selected type of correction, to extract at least one correction area from the person area in accordance with the selected type of correction, and to perform the selected type of correction on the correction area based on the other image of the person found.

2. The image-processing device according to claim 1, wherein the correction area includes at least one pupil area with a poor color tone.

3. The image-processing device according to claim 1, wherein the correction area includes at least one flesh-color area.

4. The image-processing device according to claim 1, wherein the person-area is a face area of the person.

5. The image-processing device according to claim 4, wherein the face area of the person includes at least one area including at least one element of a face of the person when the face-area is detected and wherein extracting the at least one correction area comprises extracting the correction area based on the area including the element of the face.

6. An image-pickup device comprising:

an image-pickup unit; and
the image-processing device according to claim 1,
wherein the image-processing device corrects at least one image picked up by the image-pickup unit.

7. An image-processing method comprising steps of:

inputting at least one image;
and performing, by a processor, steps of: selecting a type of correction to be performed;
detecting at least one person area from the image;
identifying at least one person in the person area;
searching an image database for another image of the identified person which is suitable for performing the selected type of correction;
extracting at least one correction area from the person area in accordance with the selected type of correction; and
performing the selected type of correction on the correction area based on the other image of the identified person.

8. A computer-readable storage medium containing a computer-executable program for controlling a computer to perform the image-processing method according to claim 7.

* * * * *